US012191058B2

(12) United States Patent
Kumar et al.

(10) Patent No.: US 12,191,058 B2
(45) Date of Patent: Jan. 7, 2025

(54) SURGE ARRESTERS AND RELATED ASSEMBLIES AND METHODS

(71) Applicant: TE CONNECTIVITY SERVICES GMBH, Schaffhausen (CH)

(72) Inventors: Senthil A. Kumar, Morrisville, NC (US); Eduardo Gastaldi, Apex, NC (US); Harry Yaworski, Cary, NC (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 187 days.

(21) Appl. No.: 16/928,357

(22) Filed: Jul. 14, 2020

(65) Prior Publication Data

US 2022/0020513 A1 Jan. 20, 2022

(51) Int. Cl.
*H01C 7/12* (2006.01)
*H01C 17/00* (2006.01)

(52) U.S. Cl.
CPC ............... *H01C 7/12* (2013.01); *H01C 17/00* (2013.01)

(58) Field of Classification Search
CPC .................................. H01C 7/12; H01C 17/00
USPC .......................................................... 361/118
See application file for complete search history.

(56) References Cited

U.S. PATENT DOCUMENTS 4,161,012 A * 7/1979 Cunningham ............ H01T 4/08 361/127
4,686,603 A 8/1987 Mosele
4,930,039 A 5/1990 Woodworth et al.
4,989,115 A 1/1991 Bourdages et al.
5,088,001 A * 2/1992 Yaworski ................. H01C 7/12 338/21
5,363,266 A 11/1994 Wiseman et al.
(Continued)

FOREIGN PATENT DOCUMENTS

CA 2247928 C * 4/2007 ............... H01C 7/10
DE 3607596 A1 9/1987
(Continued)

OTHER PUBLICATIONS

P. Paplinski and J. Wankowicz, "Application of leakage current parameters for technical diagnostics of surge arresters," in IEEE Transactions on Dielectrics and Electrical Insulation, vol. 23, No. 6, pp. 3458-3465, Dec. 2016, doi: 10.1109/TDEI.2016.005873 (Year: 2016).*

(Continued)

*Primary Examiner* — Thienvu V Tran
*Assistant Examiner* — Sreeya Sreevatsa

(57) ABSTRACT

A surge arrester includes a polymer body including a first leg having a first channel defined therein and a second leg perpendicular to the first leg and having a second channel defined therein. A varistor assembly is in the first channel. The varistor assembly includes a plurality of varistor elements electrically connected in series and forming a stack of the plurality of varistor elements. The stack has a first end surface, a second end surface, and an outer side surface extending between the first end surface and the second end surface. The varistor assembly includes a first end fitting at the first end surface of the stack, a second end fitting at the second end surface of the stack, a plurality of rods disposed around the side surface of the stack, and a polymer fill layer between the side surface of the stack and the first leg of the body.

19 Claims, 7 Drawing Sheets

(56) References Cited

U.S. PATENT DOCUMENTS

| | | | | |
|---|---|---|---|---|
| 5,497,138 | A | 3/1996 | Malpiece et al. | |
| 5,680,289 | A | 10/1997 | Robinson et al. | |
| 5,757,604 | A * | 5/1998 | Bennett | H01C 7/123 361/111 |
| 6,667,871 | B2 | 12/2003 | Berlovan et al. | |
| 6,777,614 | B1 | 8/2004 | Olaf | |
| 7,168,983 | B2 | 1/2007 | Graf et al. | |
| 7,522,399 | B2 | 4/2009 | Siljeholm et al. | |
| 8,009,402 | B2 | 8/2011 | Hartmut | |
| 8,018,707 | B2 | 9/2011 | Yaworski et al. | |
| 8,305,184 | B2 | 11/2012 | Klaube et al. | |
| 8,375,552 | B2 | 2/2013 | Normoyle et al. | |
| 8,629,751 | B2 | 1/2014 | Maher et al. | |
| 8,982,526 | B2 | 3/2015 | Anjiki et al. | |
| 10,304,598 | B1 * | 5/2019 | Pusthay | H01C 7/12 |
| 2007/0141882 | A1 * | 6/2007 | Stepniak | H01R 13/53 439/187 |
| 2009/0225487 | A1 * | 9/2009 | Klaube | H01C 7/12 338/21 |
| 2010/0307793 | A1 * | 12/2010 | Kruska | H01C 7/12 174/212 |
| 2014/0268471 | A1 * | 9/2014 | Luzzi | H01C 7/12 361/127 |
| 2015/0055265 | A1 | 2/2015 | Krauss et al. | |
| 2016/0144536 | A1 * | 5/2016 | Kruska | H01C 7/12 425/123 |
| 2021/0257136 | A1 * | 8/2021 | Hughes | H01C 7/12 |

FOREIGN PATENT DOCUMENTS

| | | | | |
|---|---|---|---|---|
| DE | 102017216024 | A1 * | 3/2019 | H01C 1/01 |
| WO | 2007008957 | A2 | 1/2007 | |

OTHER PUBLICATIONS

Jinliang He, Rong Zeng, Shuiming Chen and Youping Tu, “Thermal characteristics of high voltage whole-solid-insulated polymeric ZnO surge arrester,” in IEEE Transactions on Power Delivery, vol. 18, No. 4, pp. 1221-1227, Oct. 2003, doi: 10.1109/TPWRD.2003.817492. (Year: 2003).*

“Raychem Screened, Separable Surge Arrester RSTI-SA-10 to 41 kV”, Brochure for Raychem from TE Connectivity, 4 pages, available prior to filing date.

* cited by examiner

SURGE ARRESTERS AND RELATED ASSEMBLIES AND METHODS

BACKGROUND

Surge arresters are used to protect equipment connected to power distribution networks from damage by excessive voltage situations caused by lightning strikes, switching surges, incorrect connections, and other abnormal conditions or malfunctions.

The active element in a surge arrester is often a varistor, also referred to as a non-linear varistor because it exhibits a non-linear current-voltage relationship. If the applied voltage is less than a certain voltage (the switching or clamping voltage), the varistor is essentially an insulator and only a small leakage current flows through it. If the applied voltage is greater than the switching voltage, the varistor's resistance drops, allowing an increased current to flow through it. That is, a varistor is highly resistive below its switching voltage and substantially conductive above it.

The surge arrester is commonly attached to electrical equipment with one terminal of the device connected to a conductive member (e.g., bushing) of the equipment and the other terminal to ground. At normal system voltages, the surge arrester is resistant to current flow (except for the leakage current). However, if an overvoltage condition exceeding the switching voltage develops, the surge arrester becomes conductive and shunts the surge energy to ground while "clamping" or limiting the system voltage to a value which can be tolerated without damage to the equipment being protected.

SUMMARY

Some embodiments of the present invention are directed to a surge arrester. The surge arrester includes a polymer body including a first leg having a first channel defined therein and a second leg perpendicular to the first leg and having a second channel defined therein, with the second channel configured to receive a bushing. The surge arrester includes a varistor assembly in the first channel. The varistor assembly includes: a plurality of varistor elements electrically connected in series and forming a stack of the plurality of varistor elements, wherein the stack has a first end surface, a second end surface, and an outer side surface extending between the first end surface and the second end surface; a first end fitting at the first end surface of the stack; a second end fitting at the second end surface of the stack; a plurality of rods disposed around the side surface of the stack, each rod including a first end that is connected to the first end fitting and a second end that is connected to the second end fitting; and a polymer fill layer between the side surface of the stack and the first leg of the body.

In some embodiments, the fill layer fills an air void that would otherwise be defined between the side surface of the stack and the first leg of the body due to the plurality of rods.

In some embodiments, the fill layer completely surrounds each one of the plurality of rods.

In some embodiments, the fill layer completely surrounds the side surface of the stack.

In some embodiments, each of the plurality of rods is spaced apart from the side surface of the stack.

In some embodiments, the fill layer extends between the first end fitting and the second end fitting.

In some embodiments, the plurality of varistor elements include a plurality of metal-oxide varistor elements.

In some embodiments, the body is formed of an elastomer.

In some embodiments, the fill layer is formed of an elastomer.

In some embodiments, the body is T-shaped.

In some embodiments, the body is elbow shaped.

In some embodiments, the second channel is configured to receive a standard 600 Amp bushing.

Some other embodiments of the present invention are directed to a method of assembling a surge arrester including: forming at least a portion of a cage by connecting a first end of each of a plurality of rods to a first end fitting; receiving a stack of a plurality of varistor elements between the plurality of rods such that a first end surface of the stack is at the first end fitting; connecting a second end of each of the plurality of rods to a second end fitting; forming a fill layer around the stack of the plurality of varistor elements and around the plurality of rods to thereby form a varistor assembly; and receiving the varistor assembly in a polymer surge arrester body.

In some embodiments, receiving the varistor assembly in the polymer surge arrester body comprises molding the body around the varistor assembly.

In some embodiments, the fill layer fills an air void that would otherwise be defined between the stack and the body due to the plurality of rods. The fill layer may completely surround each of the plurality of rods.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
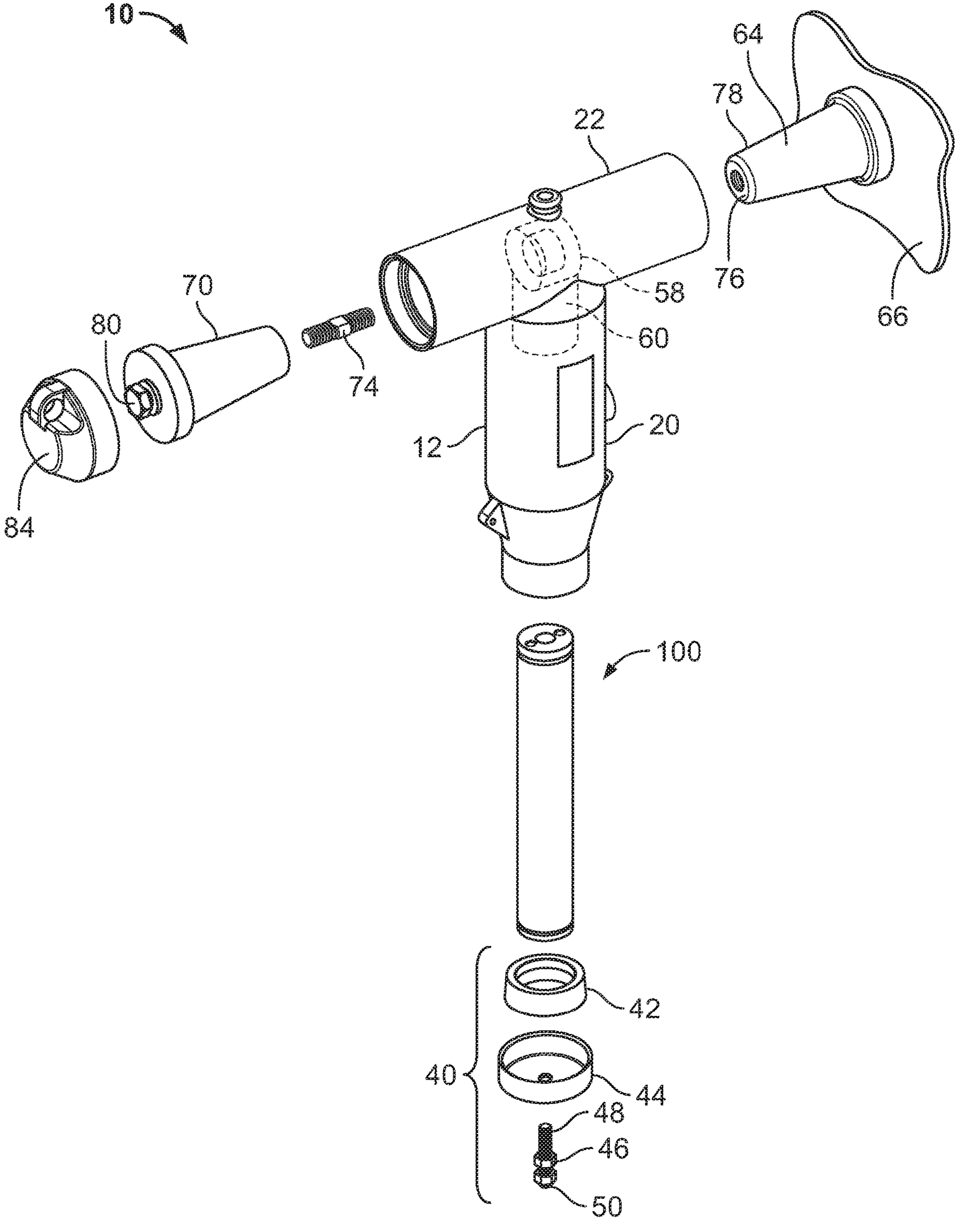
FIG. 1 is an exploded perspective view of a surge arrester according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
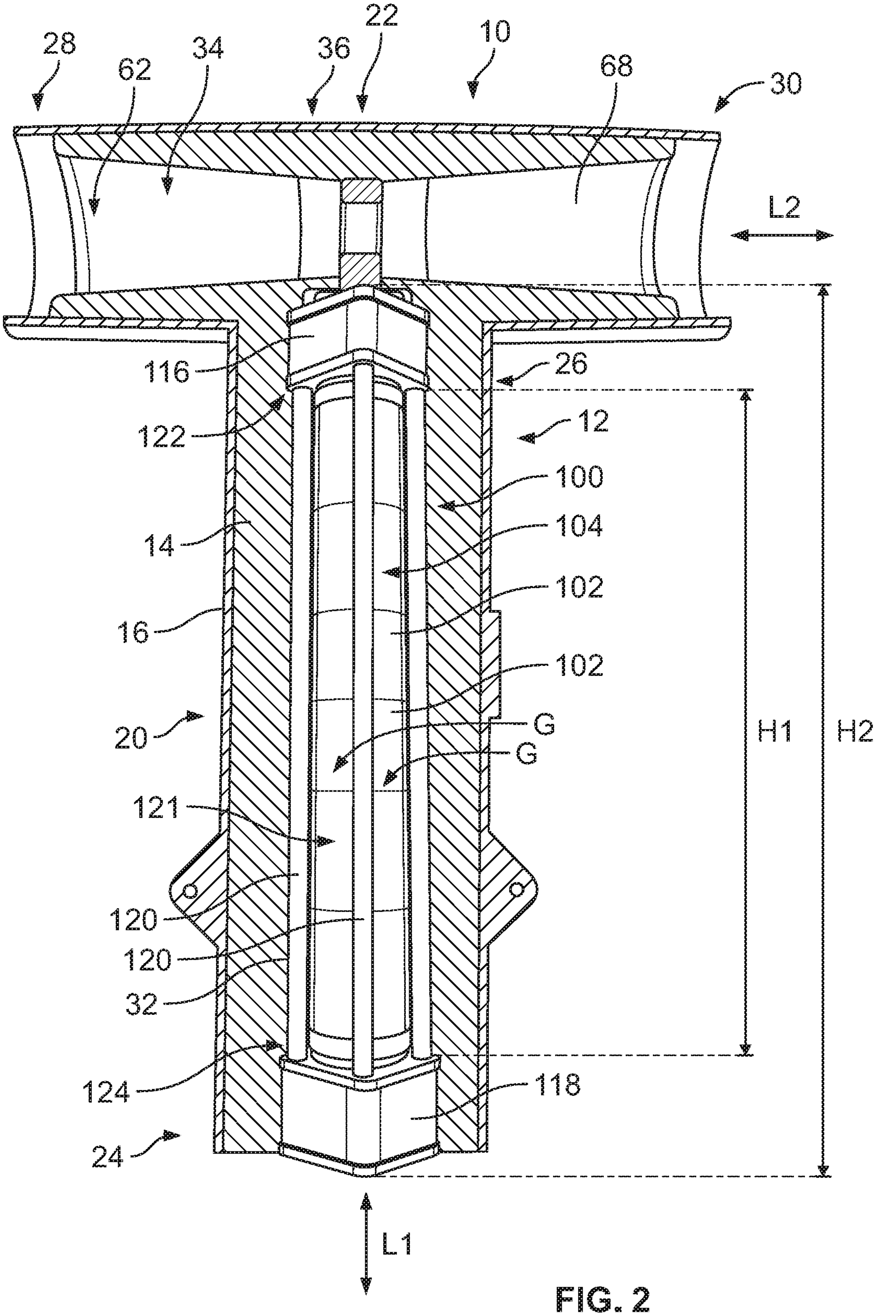
FIG. 2 is a partial sectional view of the surge arrester of FIG. 1.
Figure 3:
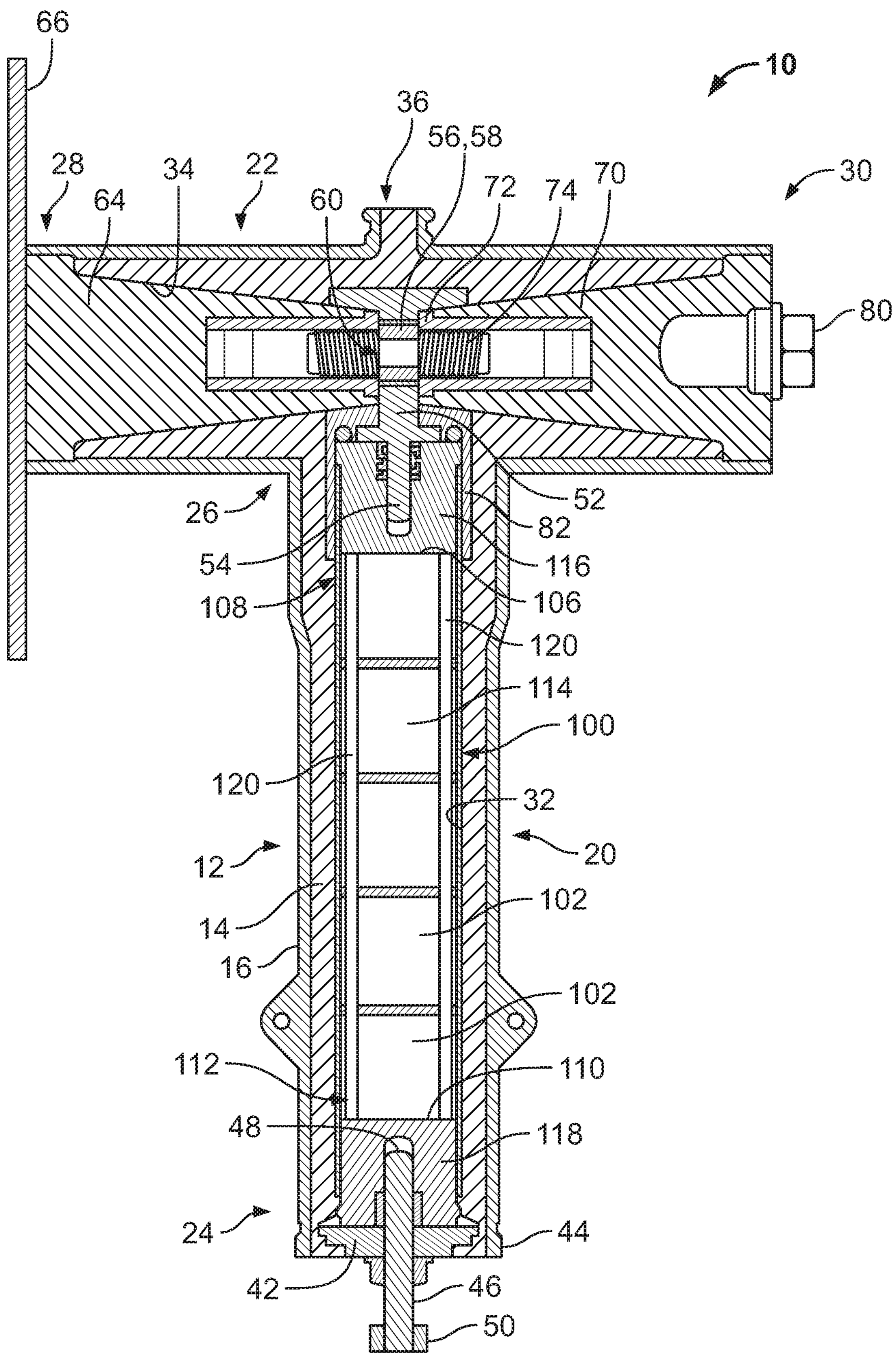
FIG. 3 is a sectional view of the surge arrester of FIG. 1 connected to electrical equipment according to some embodiments.

A surge arrester 10 according to some embodiments is illustrated in FIGS. 1-3. The surge arrester 10 includes a polymer body 12. The body 12 may be formed of an elastomer such as EPDM rubber. The body 12 may include an inner portion or layer 14 and an outer portion or layer 16. The inner portion 14 may be electrically insulating (e.g., insulating EPDM) and the outer portion 16 may be electrically conductive (e.g., conductive EPDM).

The body 12 is T-shaped and includes a first leg 20 and a second leg 22. The first leg 20 includes first and second opposite ends or end portions 24, 26 and the second leg includes first and second opposite ends or end portions 28, 30. A first channel or passage 32 is defined in the first leg 20 and extends from the first end 24 to the second end 26. A second channel or passage 34 is defined in the second leg 22 and extends from the first end 28 to the second end 30. The first channel 32 and the second channel intersect at the second end 26 of the first leg 20 and/or at a central portion 36 of the second leg 22.

The first leg 20 and/or the first channel 32 define a first longitudinal axis L1. The second leg 22 and/or the second channel 34 define a second longitudinal axis L2. The first longitudinal axis L1 and the second longitudinal axis L2 may be perpendicular or substantially perpendicular to one another.

The surge arrester 10 includes an internal varistor assembly 100 held in the first channel 32 of the first leg 20.

The varistor assembly 100 includes a plurality of varistor elements or blocks 102 that are arranged in a varistor stack 104. The stack 104 defines a third longitudinal axis L3. The longitudinal axis L3 of the stack is coaxial or parallel to the longitudinal axis L1 of the first leg 20. In some embodiments, each varistor element 102 is a metal-oxide varistor (MOV). In some embodiments, each varistor element 102 is disk shaped such that the stack 104 is cylindrical. Without limitation, the stack 104 may have a height or length H1 of between about 1 inch and 24 inches.

The stack 104 includes a first or upper end surface 106 at a first or upper end portion 108 of the stack 104 and an opposite second or lower end surface 110 at a second or lower end portion 112 of the stack 104. The stack 104 includes an outer (circumferential) side surface 114 that extends between the first and second end surfaces 106, 110.

The assembly 100 includes a first or upper end fitting 116 at the first end surface 106 of the stack 104 and a second or lower end fitting 118 at the second end surface 110 of the stack 104. The first and second end fittings 116, 118 may be made of an electrically conductive material such as aluminum. Without limitation, the assembly 100 including the stack 104 and the first and second end fittings 116, 118 may have a height or length H2 of between about 3 and 27 inches.

The assembly 100 includes a plurality of rods 120 that each extend between the first end fitting 116 and the second end fitting 118. There may be four rods 120 (one is behind the stack 104 in FIG. 2), although fewer than four rods or more than four rods may be used in various embodiments. Each of the rods 120 may be spaced apart from the stack 104. In some embodiments, the rods 120 are fiberglass reinforced polymer (FRP) rods. The rods 120 and/or one or both of the end fittings 116, 118 may define a cage 121.

Each rod 120 includes first and second opposite ends or end portions 122, 124. The first end portion 122 is connected to the first end fitting 116 and the second end portion 124 is connected to the second end fitting 118. In some embodiments, each of the end fittings is crimped such that the rods are connected thereto.

The varistor assembly 100 is held in the first channel 32 of the first leg 20. In some embodiments, the first leg 20 completely surrounds the assembly 100. In some embodiments, the body 12 is molded around the assembly 100. In some embodiments, the body 12 or the first leg 20 thereof directly contacts each of the rods 120 and/or is spaced apart from the stack 104.

An end cap assembly 40 may be coupled to the first end 24 of the first leg 20. The end cap assembly 40 includes an electrical connection to the varistor assembly 100 and may further help to retain the varistor assembly 100 in the body 12. The end cap assembly 40 may include end cap portions 42, 44 that secure the varistor assembly 100 in the first leg 20 of the body 12 and a ground connection 46 extends through the end cap 40 and into the second end fitting 118. The ground connection 46 is electrically connected to the varistor stack 104 through the second end fitting 118. The ground connection 46 includes first and second opposite ends 48, 50. The first end 48 is electrically and mechanically connected to the second end fitting 118. The second end 50 extends outside the body 12 and is configured to be connected to an external ground.

The end cap may include a first end cap portion 42 and a second end cap portion 44. The first end cap portion 42 may be received in the first channel 32 of the first leg 20 and below the second end fitting 118. The second end cap portion 44 may be installed below the first end cap portion 42 and around the first leg 20. The second end cap portion 44 may be electrically shielded.

A lug 52 includes a first end portion 54 electrically and mechanically connected to the first end fitting 116 and a second end portion 56 positioned in the second channel 34 of the second leg 22 (e.g., at the central portion 36 thereof). The second end portion 56 of the lug 52 includes a head 58 that defines an opening or channel 60. The lug 52 is electrically connected to the stack 104 through the first end fitting 116.

A bushing receiving region 62 is located in the second channel 34 of the second leg 22 between the first end 28 and the central portion 36 of the second leg 22. The bushing receiving region 62 is configured to receive a bushing 64 from electrical equipment 66 (e.g., switchgear, transformer, etc.). The bushing 64 may be a 200 Amp or 600 Amp standard shaped bushing.

A plug receiving region 68 is located in the second channel 34 of the second leg 22 between the second end 30 and the central portion 36 of the second leg 22. The plug receiving region 68 is configured to receive an insulating plug 70. The plug 70 has an end 72 that, in position, is at the central portion 36 of the second leg 22 and is configured to be coupled to the bushing 64. The bushing 64 and the plug 70 may be coupled together using a coupling component 74 such as a threaded rod or other fastener. The surge arrester 10 is secured in an assembled state when the bushing 64 is coupled to the plug 70.

In the assembled state, an end 76 of the bushing 64 may be received in the opening 60 of the lug 52 such that an outer face 78 of the bushing 64 is pressed into contact with the head 58 of the lug 52. This provides an electrical pathway from the bushing 64 to the varistor stack 104.

In the assembled state, the coupling component 74 may be threadingly received in each of the bushing 64 and the plug 70. The plug may include a drive head 80 such that rotation of the drive head 80 allows the arrester 10 to be connected to and disconnected from the bushing 64.

In some embodiments, the body 12 includes an additional inner layer 82 of conductive material (e.g., conductive EPDM). The layer 82 may surround an upper portion of the first channel 32 of the first leg and may surround the second end fitting 118 to provide a faraday cage.

A protective cover 84 may be positioned over the plug 70 after attaching the arrester 10 to the bushing 64. The protective cover, like the arrester body 12, may be electrically shielded and may be one of the components that provide an arrester that is fully electrically shielded. The protective cover 84 may be the same material as the arrester body 12.

The present invention provides a separable surge arrester used in underground residential power applications that can involve a fault current. The surge arrester is particularly useful for applications that require high levels of short circuit current such as in a 600 A switchgear application where faults can be around 20,000 A.

It is believed that existing underground shielded separable connector arresters that comply with IEEE 386 standard do not have a commercially available 20,000 A fault current rating (and do not exceed 10,000 A). For a 600 A application, the fault currents can exceed 10,000 A on a routine basis and the arrester would realistically need 20,000 A or 25,000 A for 10 cycles. Also, ASTM F855 is the key temporary grounding standard for utilities and applies to devices such as 600 A switchgear connectors. It is believed this standard is not currently being met by products available on the market.

The present invention uses a caged block stack as compared to a wrapped or glued concept currently available on the market for underground arresters. The cage retains the blocks as one unit thereby preventing any fragments from ejecting from the arrester under a short circuit condition in the system. While the cage concept is not new for overhead systems, it is for an underground arrester such as a T-body or elbow arrester.

The IEEE underground short circuit standard requires fault current of 10 kA for 10 cycles as is commonly found on utility distributions circuits. However, underground arresters are being used on windfarm collector circuits where higher levels of fault current are generated. The open cage design provides better performance in the failure mode short circuit test and would improve the short circuit performance to levels required circuits in the windfarm market. The present invention provides a design and assembly process which is unique and favorable for integration of the open cage to shielded undergrounded arresters.

Figure 4:
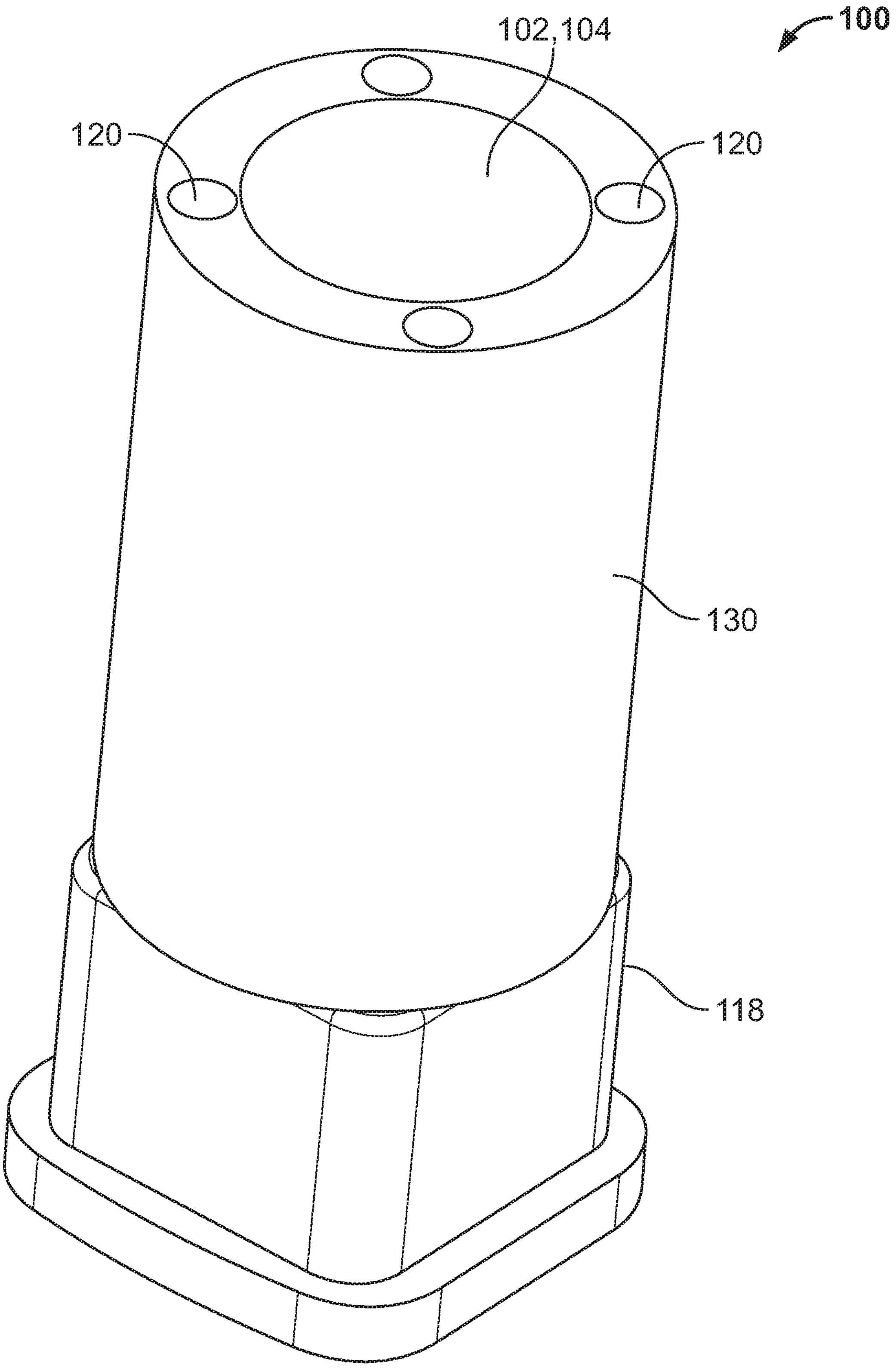
FIG. 4 is a top perspective view of a varistor assembly of the surge arrester of FIGS. 1-3 according to some embodiments.
Figure 5:
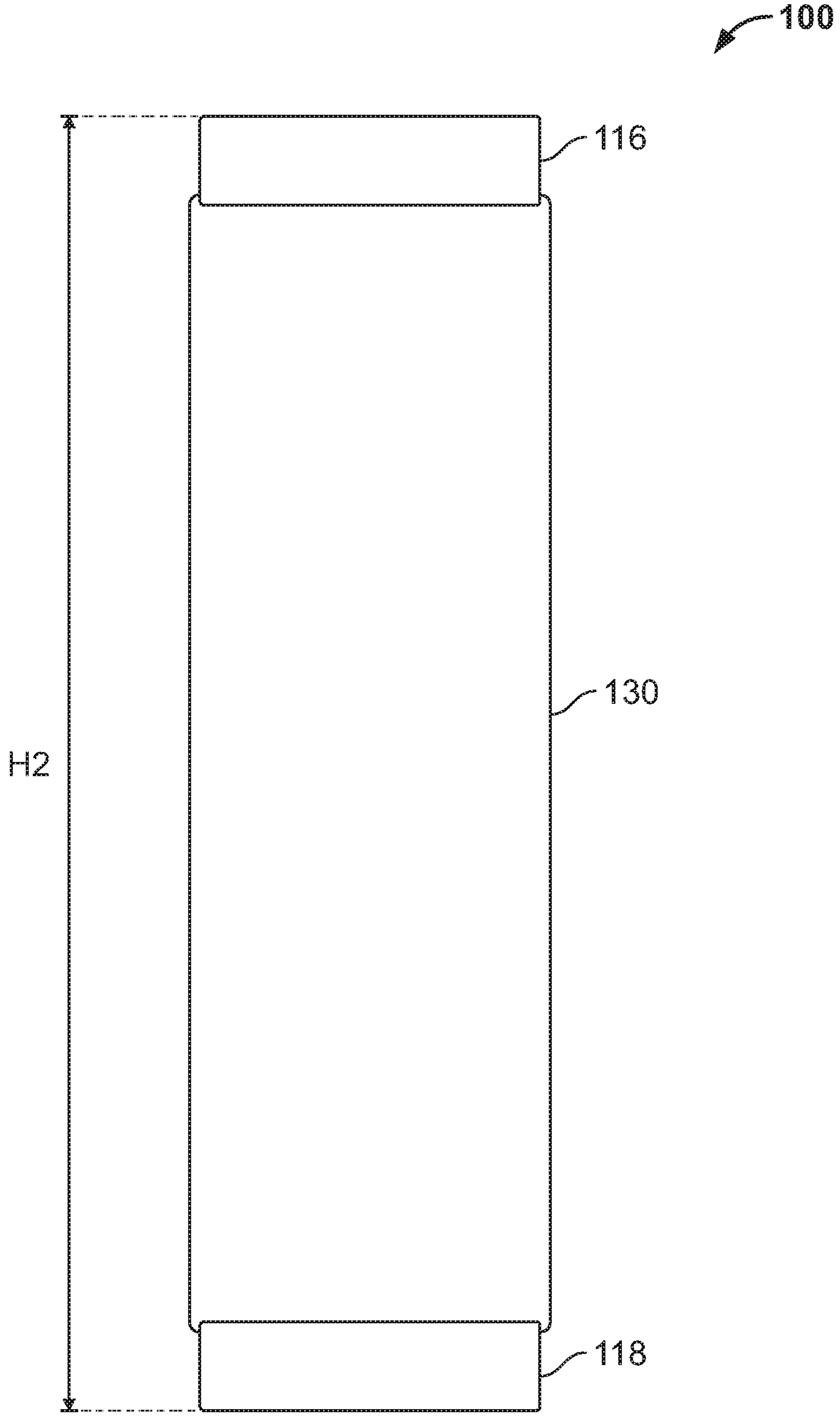
FIG. 5 is a side view of the varistor assembly of FIG. 4.
Figure 6:
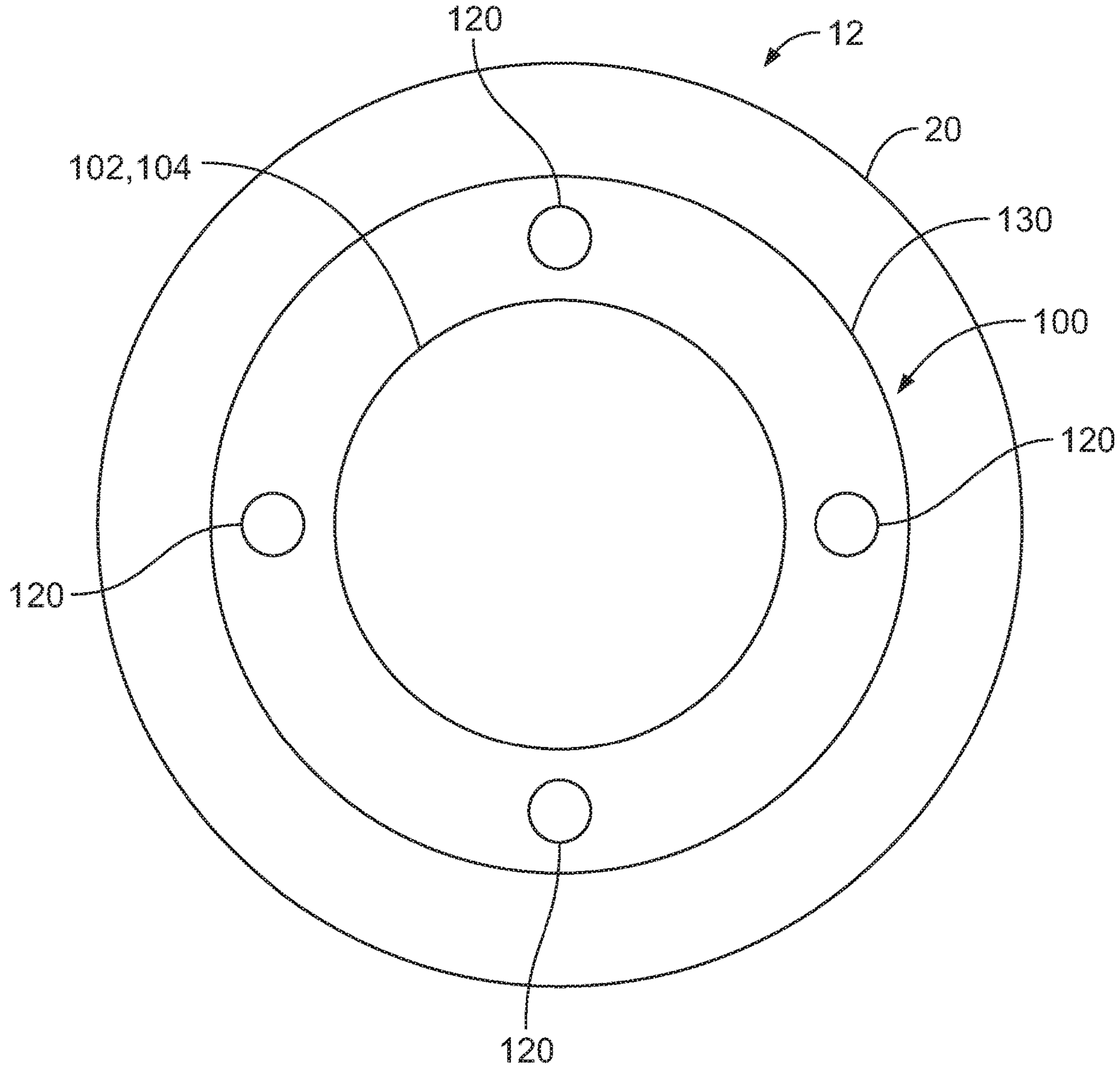
FIG. 6 is a sectional view of the varistor assembly of FIG. 5 received in a body of the surge arrester of FIG. 3.

Referring to FIGS. 4-6, in some embodiments, the varistor assembly 100 includes a polymer fill layer 130 molded over the varistor elements 102 (i.e., over the varistor stack 104) and around each of the rods 120. In some embodiments, the layer 130 is an elastomer layer such as EPDM. In some embodiments, the layer 130 is a silicone layer.

The fill layer 130 may completely surround the varistor stack 104. The layer 130 may extend from the first end fitting 116 to the second end fitting 118. Each of the rods 120 may be completely surrounded by the fill layer 130. The arrester body 12 or the first leg 20 thereof may completely surround the layer 130 and may directly contact the layer 130 (e.g., around the entire circumference of the layer 130 and along the entire axial length of the layer 130).

There may be gaps or voids V (FIG. 2) such as air gaps or voids between adjacent ones of the rods 120 as well as between the varistor stack 104 and the arrester body 12. The fill layer 130 may fill or completely fill the voids.

The fill layer 130 may fill the air voids V and provide a high dielectric layer that prevents electrical discharge that otherwise may occur in the air voids V. The electrical discharge may cause ionization resulting in failure of the arrester body 12. Therefore, the fill layer 130 in combination with the cage may provide a more robust surge arrester.

A method for assembling the surge arrester 10 will now be described. The first end 122 of each one of the rods 120 is connected to the first end fitting 116. In some embodiments, the first end fitting 116 is then crimped to secure the first ends 122 of the rods 120 in the first end fitting 116. The stack 104 of varistor elements 102 may be received between the rods 120. Once the stack 104 is in place, the second end 124 of each one of the rods 120 is connected to the second end fitting 118. In some embodiments, the second end fitting 118 is then crimped to secure the second ends 124 of the rods 120 in the second end fitting 118. The varistor assembly 100 may then be fully assembled or, optionally, the fill layer 130 may be molded around the varistor stack 104 and the rods 120. The varistor assembly 100 may then be received in the first channel 32 of the first leg 20 of the body 12. In some embodiments, the body 12 is molded around the varistor assembly 100. In some embodiments, the body 102 and the fill layer 130 are integrally formed (e.g., the fill layer 130 is included as part of the body 102 that is molded around the varistor assembly 100 including the varistor stack 104 and the rods 120).

Figure 7:
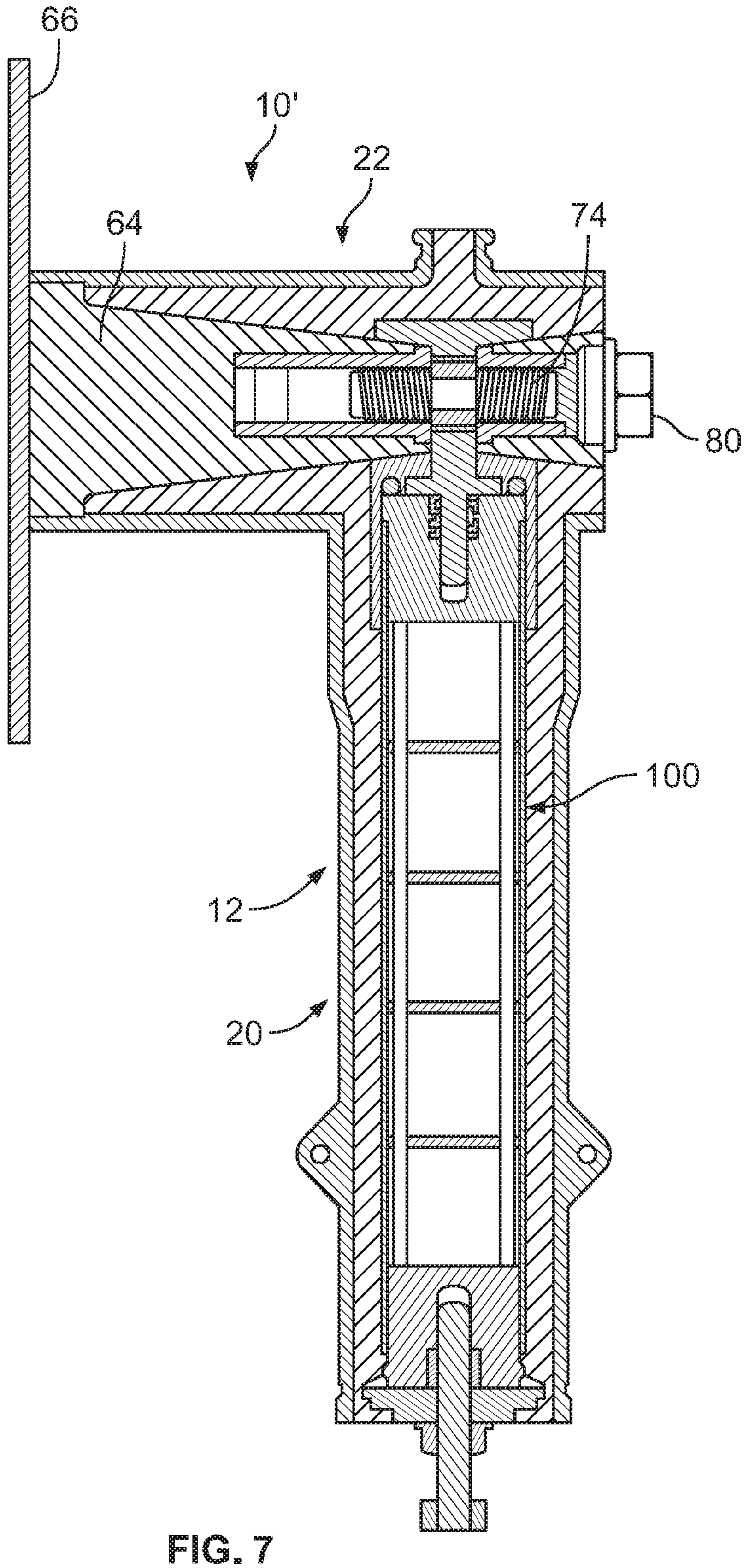
FIG. 7 is a sectional view of a surge arrester according to some other embodiments.

FIG. 7 illustrates an elbow surge arrester 10' that is substantially similar to the T-shaped surge arrester described above. The primary difference is the omission of the plug 70. In some embodiments, the drive head 80 directly engages the coupling component 74 that is connected to the bushing 64. In some embodiments, the varistor assembly 100 includes the fill layer 130 described above.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A surge arrester comprising:

a polymer body comprising:

a first leg having a first channel defined therein; and a second leg perpendicular to the first leg and having a second channel defined therein, the second channel configured to receive a bushing;

a varistor assembly in the first channel, the varistor assembly comprising:

a plurality of varistor elements electrically connected in series and forming a stack of the plurality of varistor elements, wherein the stack has a first end surface, a second end surface, and an outer side surface extending between the first end surface and the second end surface;

a first end fitting at the first end surface of the stack;

a second end fitting at the second end surface of the stack;

a plurality of rods disposed around the outer side surface of the stack, each of the plurality of rods comprising a first end that is connected to the first end fitting and a second end that is connected to the second end fitting; and a polymer fill layer between the outer side surface of the stack and the first leg of the body, wherein the polymer fill layer completely surrounds the outer side surface of the stack and extends between the first end fitting and the second end fitting, wherein the first channel defines a first longitudinal axis and the second channel defines a second longitudinal axis that is perpendicular to the first longitudinal axis, wherein the polymer fill layer completely surrounds each one of the plurality of rods, wherein the polymer body comprises an electrically insulating inner layer and an electrically conductive outer layer, wherein each of the plurality of rods is spaced apart from the polymer body, and wherein the first channel has a first diameter that is greater than a second diameter of the stack.

2. The surge arrester of claim 1 wherein the polymer fill layer fills an air void that would otherwise be defined between the side surface of the stack and the first leg of the body due to the plurality of rods.

3. The surge arrester of claim 1 wherein each of the plurality of rods is spaced apart from the outer side surface of the stack.

4. The surge arrester of claim 1 wherein the plurality of varistor elements comprise a plurality of metal-oxide varistor elements.

5. The surge arrester of claim 1 wherein the body is formed of an elastomer.

6. The surge arrester of claim 1 wherein the polymer fill layer is formed of an elastomer.

7. The surge arrester of claim 1 wherein the body is T-shaped.

8. The surge arrester of claim 1 wherein the body is elbow shaped.

9. The surge arrester of claim 1 wherein the second channel is configured to receive a standard 600 Amp bushing.

10. The surge arrester of claim 1 wherein the polymer fill layer extends only between the first end fitting and the second end fitting.

11. The surge arrester of claim 1 wherein the polymer fill layer has a constant outer diameter.

12. A method of assembling a surge arrester, the method comprising:

forming at least a portion of a cage by connecting a first end of each of a plurality of rods to a first end fitting;

receiving a stack of a plurality of varistor elements between the plurality of rods such that a first end surface of the stack is at the first end fitting;

connecting a second end of each of the plurality of rods to a second end fitting;

forming a fill layer around the stack of the plurality of varistor elements and around the plurality of rods to thereby form a varistor assembly, wherein the fill layer completely surrounds an outer side surface of the stack extending between the first end surface of the stack and an opposite second end surface of the stack and extends between the first end fitting and the second end fitting, and wherein the fill layer completely surrounds each of the plurality of rods; and receiving the varistor assembly in a first channel of a polymer surge arrester body, wherein the polymer surge arrester body comprises an electrically insulating inner layer and an electrically conductive outer layer, wherein each of the plurality of rods is spaced apart from the polymer surge arrester body, and wherein the first channel has a first diameter that is greater than a second diameter of the stack.

13. The method of claim 12 wherein receiving the varistor assembly in the polymer surge arrester body comprises molding the body around the varistor assembly.

14. The method of claim 12 wherein the fill layer fills an air void that would otherwise be defined between the stack and the body due to the plurality of rods.

15. The method of claim 12 wherein each of the plurality of rods is spaced apart from the outer side surface of the stack.

16. The method of claim 12 wherein the body is formed of an elastomer.

17. The method of claim 12 wherein the fill layer is formed of an elastomer.

18. The method of claim 12 wherein the polymer surge arrester body comprises a first leg having a first channel defined therein and a second leg having a second channel defined therein, and wherein the first channel defines a first longitudinal axis and the second channel defines a second longitudinal axis that is perpendicular to the first longitudinal axis.

19. A surge arrester comprising:
- a polymer body comprising:
  - a first leg having a first channel defined therein; and
  - a second leg perpendicular to the first leg and having a second channel defined therein, the second channel configured to receive a bushing;
- a varistor assembly in the first channel, the varistor assembly comprising:
  - a plurality of varistor elements electrically connected in series and forming a stack of the plurality of varistor elements, wherein the stack has a first end surface, a second end surface, and an outer side surface extending between the first end surface and the second end surface;
  - a first end fitting at the first end surface of the stack;
  - a second end fitting at the second end surface of the stack;
  - a plurality of rods disposed around the outer side surface of the stack, each of the plurality of rods comprising a first end that is connected to the first end fitting and a second end that is connected to the second end fitting; and
  - a polymer fill layer between the outer side surface of the stack and the first leg of the body, wherein the polymer fill layer completely surrounds the outer side surface of the stack and extends between the first end fitting and the second end fitting, wherein the polymer fill layer completely surrounds each one of the plurality of rods, wherein the polymer body comprises an electrically insulating inner layer and an electrically conductive outer layer, wherein each of the plurality of rods is spaced apart from the polymer body, and wherein the first channel has a first diameter that is greater than a second diameter of the stack.

* * * * *